J. W. GREEN.
ROTARY GAS ENGINE.
APPLICATION FILED FEB. 24, 1919.
1,308,352.
Patented July 1, 1919.
4 SHEETS—SHEET 1.
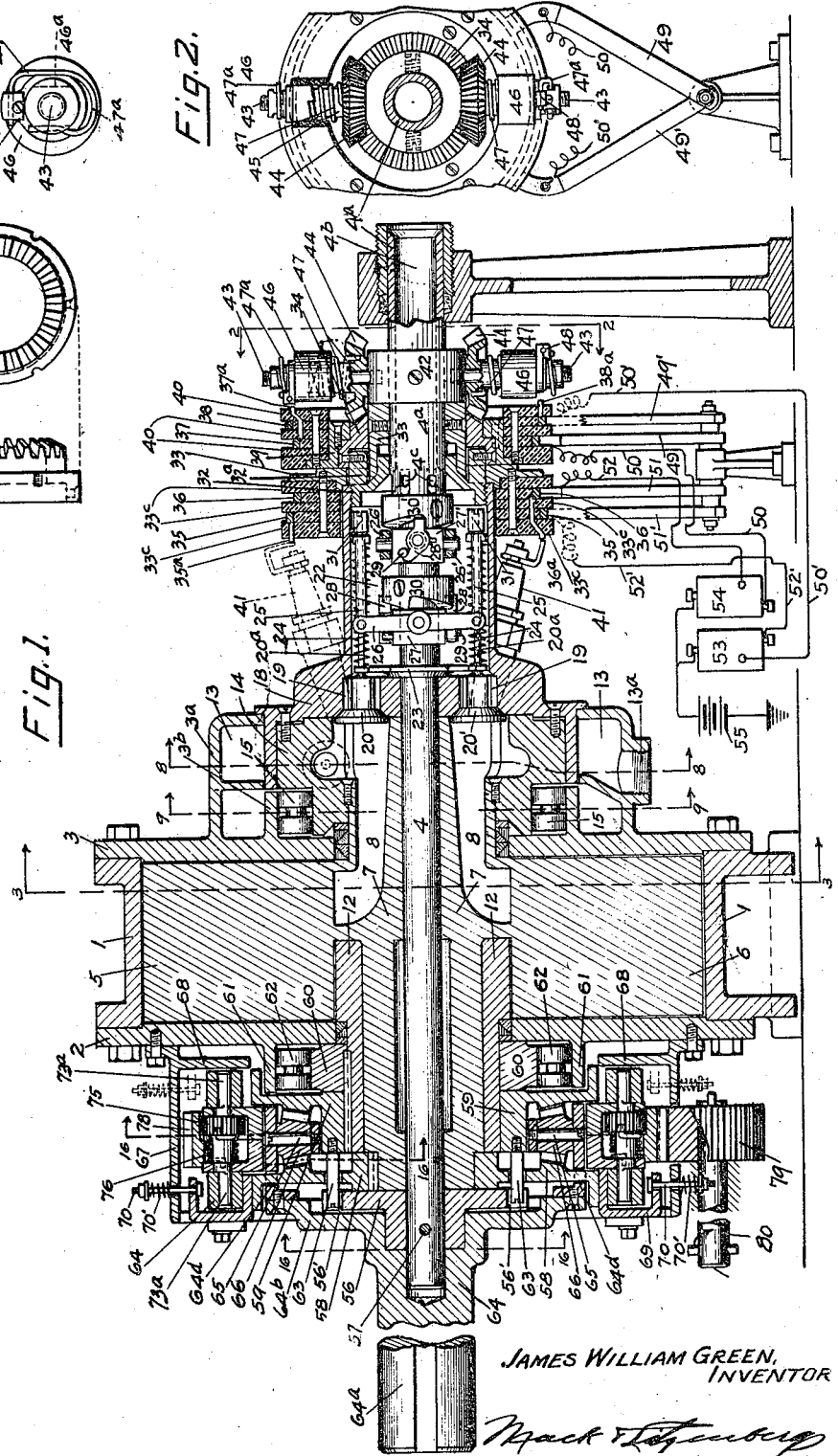
JAMES WILLIAM GREEN,
INVENTOR
BY Mack & Lotzenburg
ATTYS J. W. GREEN.
ROTARY GAS ENGINE.
APPLICATION FILED FEB. 24, 1919.
1,308,352.
Patented July 1, 1919.
4 SHEETS—SHEET 2.
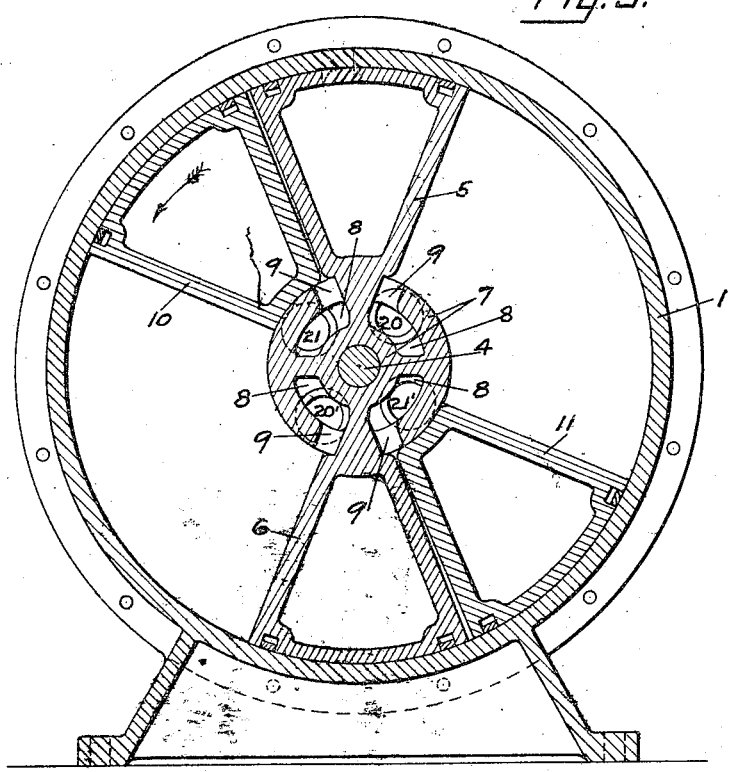
Fig. 3.
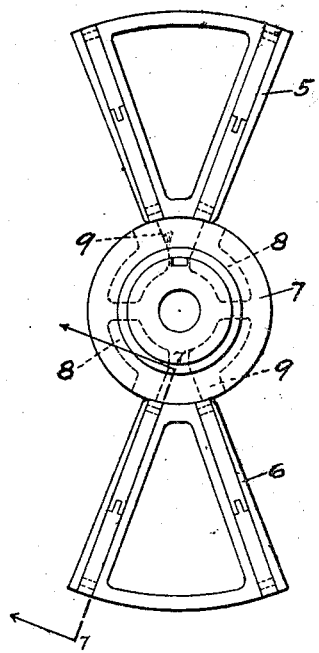
Fig. 6.
Fig. 4.
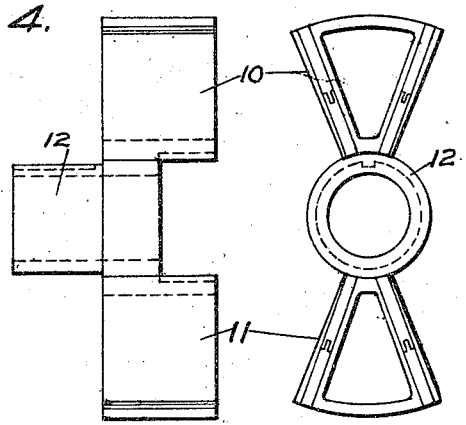
Fig. 5.
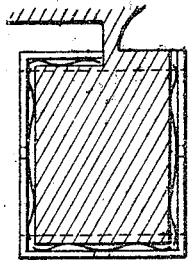
Fig. 7.
JAMES WILLIAM GREEN,
INVENTOR.
By
ATTYS.

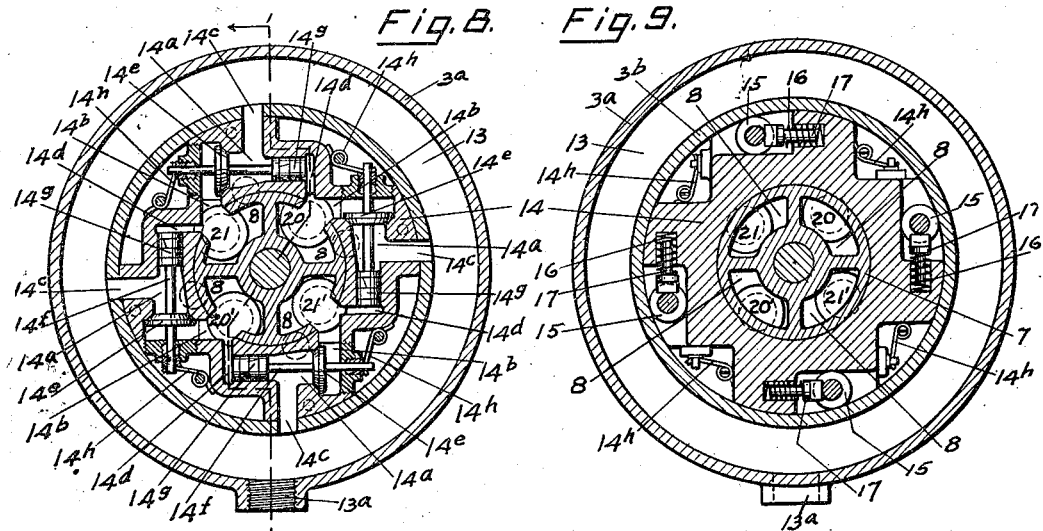
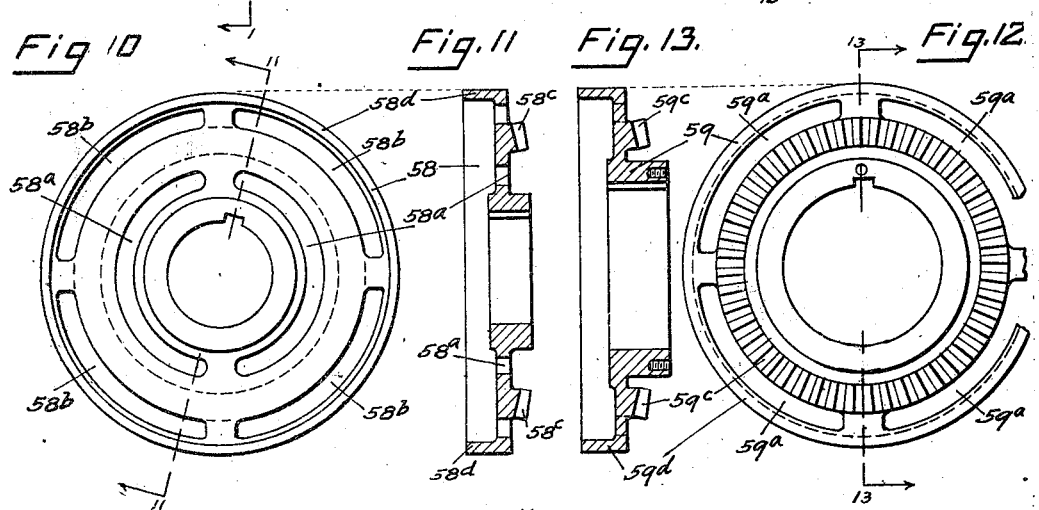
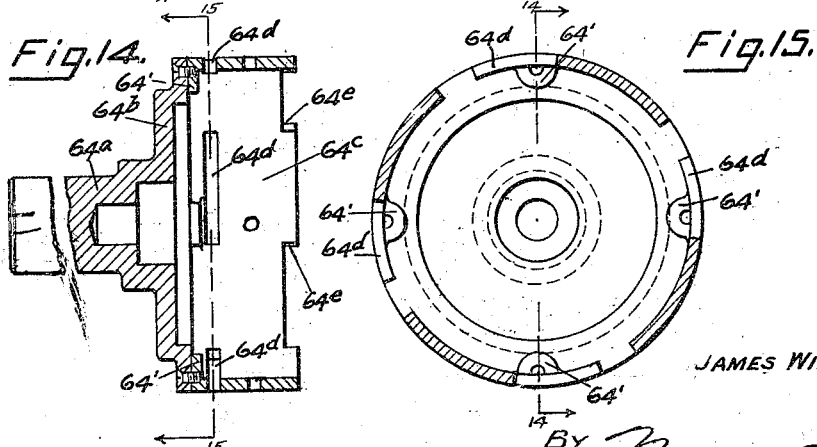

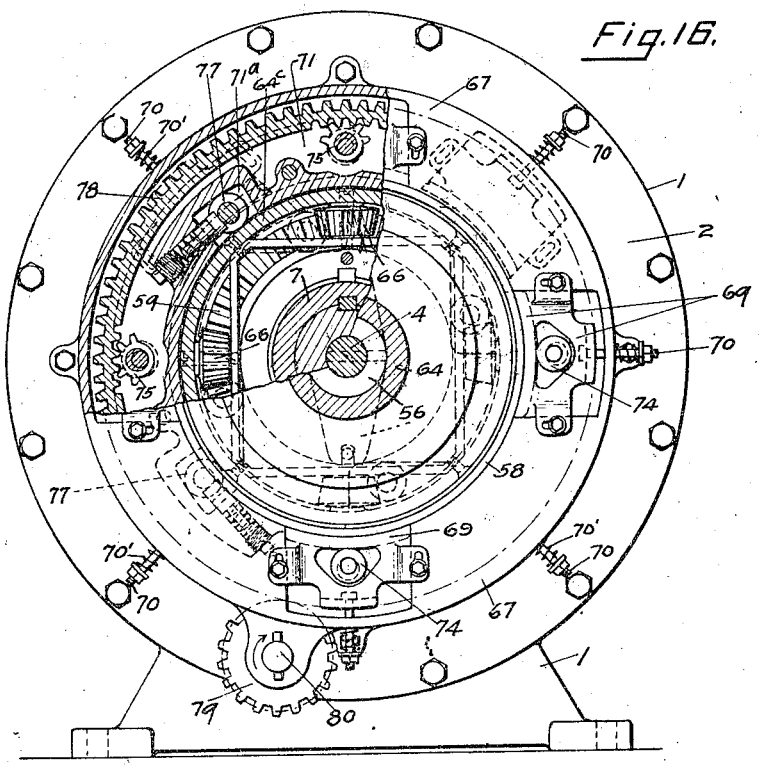

UNITED STATES PATENT OFFICE.

JAMES WILLIAM GREEN, OF PORTLAND, OREGON.

ROTARY GAS-ENGINE.

1,308,352.   Specification of Letters Patent.   Patented July 1, 1919.

Application filed February 24, 1919. Serial No. 279,458.

*To all whom it may concern:*

Be it known that I, JAMES WILLIAM GREEN, a citizen of the United States, residing in the city of Portland, county of Multnomah, and State of Oregon, have invented certain new and useful Improvements in Rotary Gas-Engines, of which the following is a specification.

My invention relates to rotary gas engines of the character shown and described in my copending application, filed December 22, 1916, Serial No. 138,397.

The principal object of the present invention is to provide certain improvements in the valve mechanisms which control the inlet and exhaust to and from the piston casing; the spark mechanism and its control; to provide a starting mechanism formed as a part of my engine; and, in general, to provide in a rotary gas engine an improved and simplified mechanism for feeding and controlling and igniting the explosive charges, and at the same time to provide an engine of compact form.

In order to more fully explain my invention, I have illustrated the same on the accompanying sheets of drawings, in which,—

Figure 1 is a vertical, longitudinal sectional view thereof;

Fig. 2 is a fragmentary transverse sectional view on line 2—2, of Fig. 1;

Fig. $2^a$ shows edge and face views of a special gear;

Fig. $2^b$ is a top plan view of a detail, shown in Fig. 2;

Fig. 3 is a transverse sectional view taken on line 3—3 of Fig. 1;

Fig. 4 is a side elevation of one pair of pistons;

Fig. 5 is an end view thereof;

Fig. 6 is an end view of the other pair of pistons;

Fig. 7 is a fragmentary sectional view taken on line 7—7 of Fig. 6;

Fig. 8 is a transverse sectional view on line 8—8, Fig. 1;

Fig. 9 is a similar view on line 9—9 of Fig. 1;

Fig. 10 is a face view of a slotted gear element;

Fig. 11 is a sectional view thereof on line 11—11;

Fig. 12 is a face view of another special gear element;

Fig. 13 is a sectional view thereof on line 13—13;

Fig. 14 is a sectional view through an end bearing member;

Fig. 15 is an inner view thereof;

Fig. 16 is a vertical sectional view taken on the irregular line 16—16 of Fig. 1;

Fig. 17 is a sectional view of a detail of construction;

Figs. 18, 19 and 20 are detail views;

Figs. 21, 22, 23 and 24 are detail views.

Referring now more in detail to the drawings, my invention as here shown comprises a cylindrical piston casing 1, having two side plates or heads, 2 and 3. Mounted through said casing is a main shaft 4, on which is mounted a pair of pistons, 5 and 6, on a hub like structure 7, having four ports extending therethrough and communicating with the interior of the casing, between the pistons, as at 9, as will be understood from Figs. 1 and 3. Also mounted within said casing 1, is a second pair of pistons 10 and 11, on a sleeve 12, which sleeve turns on the hub like structure 7, which carries the pistons 5 and 6, and has an interfitting connection therewith, as will be understood from Fig. 1 and Fig. 3. Said pistons are, therefore, in crossed relationship, and must advance alternately, step by step, or intermittently, in a manner hereinafter more fully described. Piston head 3 has an extension $3^a$ thereon forming an exhaust chamber 13, provided with an exhaust pipe connection at $13^a$. Secured to the outer end of the hub structure 7, is an annular exhaust valve block 14, which turns with said hub structure 7. Said exhaust valve block has four valve chambers, $14^a$ therein, communicating at one end, as at $14^b$ with the ports 8, 8 in the hub structure 7, and at $14^c$ with the exhaust chamber 13, in the extension $3^a$, said valve chambers being connected with each other, as at $14^d$. Mounted in each valve chamber is a valve member $14^e$, on a valve rod, $14^f$, at the opposite end of which is a piston member $14^g$. Each valve rod and its valve is held normally closed by means of a spring $14^h$ connected with the end of the valve rod, as indicated clearly in Figs. 8 and 9. The explosion in the piston chamber, through the ports 8, operates, by reason of the communication at $14^d$ to move the piston member $14^g$ to open the valve member $14^e$. Thus the explosion in one chamber operates through the members just mentioned to open the valve member of an adjacent valve chamber for the exhaust of that chamber. It will also be noted that the explosion impulse also holds the valve member of the chamber in which the explosion takes place more firmly closed. This is also true of the inlet valve members hereinafter referred to, which valve members are designated 20, 20', 21, and 21' and can be seen in the background in Figs. 8 and 9.

Mounted between the extension casing $3^a$ and said exhaust valve block 14, are holding rollers 15, 15, clearly seen in Figs. 1 and 9, said rollers being four in number and being normally pressed toward their holding positions by means of expansion springs 16, on plungers 17, set in the block 14, as indicated in Fig. 9, whereby said valve block 14, and the hub member 7, and the pistons 5 and 6, carried thereby, are locked against movement in one direction, that is, against any backward movement, as said locking rollers wedge between said exhaust valve block 14 and the inner wall $3^b$, of said extension $3^a$.

Secured to the outer side of said exhaust valve block 14 is an inlet valve body, 18, having passageways 19, therethrough, controlled by valve members 20, 20', 21 and 21', for controlling the inlet from the chamber 22, in said inlet valve body 18, through the passageways or ports 8, 8, to the piston casing, between the pistons, as seen in Fig. 3. Said valve members are mounted on valve operating rods, $20^a$ and $20^b$, projecting through a spider member 23, Fig. 1, and provided with springs 24, normally holding said valve members closed, said springs 24 being positioned to bear at one end against said spider member 23, and at their opposite ends against U-shaped members or yokes 25, supported at their ends on cross members, 26, 26, and 26', 26', respectively, which cross members are pivotally connected with collars 27 and 27', movable on the shaft 4, said collars being provided on their opposite sides with ratchet dogs, as 28, 28 and 28', 28', each of said ratchet dogs being stopped by a pin, as 29, and at its opposite end engaged by cam collars 30 and 30', secured to the shaft 4, as clearly indicated in Fig. 1. The valve rods 20 are provided at their ends outside the U-shaped yokes 25, with adjustment nuts 31. The valves are positively opened and closed by the cam collars 30 and 30' and the springs 24, as will be clear from Fig. 1. The cam collars operate on the ratchet dogs 28 and 28', the tapering cam surfaces moving the dogs and their collars. The ratchet dogs permit the cam collars to turn past the dogs as they are intermittently turned forwardly, it being understood that there is a relative turning of the shaft 4 and the cam collars secured thereto, with relation to the cage or member carrying the valves 20, 20', 21, 21' and their operating mechanisms. This will be readily understood when it is remembered that the hub 7, and its pistons 5 and 6, are intermittently stepped forwardly, carrying the members 14, 18 and the valve mechanisms therein, with it, and then the shaft 4 and the pistons 10 and 11, through connections hereinafter more fully described, are stepped forwardly, that is, the two pairs of pistons are successively stepped forwardly, turning their respective connections with them. The ratchet dogs are provided with any suitable springs for normally holding them against their stop pins 29.

The end of the shaft 4, beyond the cam collar 30', is somewhat larger than the rest of the shaft, as at $4^a$, and is bored hollow in its end, as at $4^b$, to provide an intake to the chamber 22 in the inlet valve body, 18, through the ports $4^c$, through the wall of said hollow pipe $4^a$. Mounted in the end of said inlet valve body 18, is a bearing member 32, also seen in Figs. 19 and 20, which turns on the large portion $4^a$ of the main shaft 4, as will be clear from Fig. 1. Secured to the shaft $4^a$ is a member 33, seen also in Figs. 21 and 22, which fits over the end of the bearing member 32. Said member 33 has two semi-circular slots $33^a$, $33^b$ therein, as seen in Figs. 21 and 22, through which slots project the lugs $32^a$ and $32^b$ on the member 32, as will be more clear from Figs. 19 and 20.

Mounted on the member 33, is a special gear member 34, also shown in Fig. $2^a$. Secured to the member 33, shown in section in Fig. 1, and also shown in Figs. 21 and 22, are two spaced contact rings 35 and 36, insulated from each other by fiber rings 37. Contact ring 35 is provided with a projecting pin $35^a$, and contact ring 36 is provided with a contact pin $36^a$. These contact rings and their insulating rings, are all secured together and are secured to the member 33, which is secured to the shaft $4^a$, and turn with said shaft. Similar contact rings 37 and 38 are mounted on a member 39, seen in Figs. 23 and 24, mounted around the special gear 34, shown in Fig. $2^a$. Said contact rings 37 and 38 are insulated from each other by fiber rings 40. Said ring 37 is provided with two contact pins $37^a$ and $37^b$, oppositely disposed to each other, and contact ring 38 is also provided with two contact pins $38^a$ and $38^b$, also oppositely disposed with relation to each other, and only one of which is shown. Said four contact pins $37^a$, $37^b$, $38^a$ and $38^b$ project from the side of the ring structure, at equal distances apart, occupying the quarter positions. The contact rings 35ª and 36ª project in the opposite direction and are two in number and occupy diametrically opposite positions. Contact pins are positioned so as to be engaged by terminals on four spark plugs, as 41, one of which is shown in full lines and one of which is indicated in dotted lines. Secured to the hollow shaft 4ª is a collar 42, having oppositely projecting bearing pins 43, 43, on which are loosely mounted two gears, 44, 44, having hub portions 45, projecting into hard rubber sleeves, 46, 46, lined with metal, and into which each has extended a coiled spring 47, one end of which is secured to the gear, 44, as indicated in Fig. 1, and the other end of which is arranged within said hard rubber sleeve 46, to provide a ratchet action to prevent said sleeve from turning in one direction, but permitting it to turn in the opposite direction, as indicated, Fig. 2. Each of said hard rubber sleeves 46 is provided on its outer end with a spring holding member 47ª, Fig. 2ᵇ, one of which is secured to the pin 43, by means of a collar 48, and its opposite end is positioned to bear against the opposite sides of the sleeve 46 and to hold said sleeve 46 from turning in one direction but permitting it to be turned by force in the other direction. To this end said sleeve is provided in its opposite sides with notches, 46ª, as indicated in dotted lines Fig. 2ᵇ. As the shaft 4ª and the collar 42 are intermittently rotated, they carry said sleeves 46 and the gears 44 around the axis of the shaft. The gears 44 are in mesh with the gear teeth of the member 34, so that said sleeves are also turned about their own axes. These movements are so timed that the collars 48, on said sleeves, successively contact with the contact pins 37ª and 37ᵇ and 38ª and 38ᵇ, hereinbefore referred to, for completing electric circuits to the spark plugs, through connections to be further described.

Bearing against the contact rings 37 and 38 are brush members 49 and 49′, connected by wires 50 and 50′ to the coils 53 and 54, as indicated. The contact rings 35 and 36 are engaged by brushes 51, 51′, connected by wires 52 and 52′ to said coils 54 and 53, as indicated. 53 and 54 designate two vibrator coils and 55 designates three dry cell batteries, as the source of electrical energy. By this arrangement and these connections it is possible to successively energize the four spark plugs, designated 41 and arranged around the member 18, which turns with the sleeve structure 7, through which the four ports 8 are formed, said ports serving successively as inlet and then as exhaust ports, as hereinbefore described. It will be understood, of course, that one set of contact rings, 35 and 36 and their contact points 35ª and 36ª, are turned intermittently with pistons 5 and 6, and that the contact rings 37 and 38 and their four contact points are turned intermittently, through their connections, with pistons 10 and 11. The pistons follow each other step by step. That is, when one pair of pistons move forwardly a step and are held by their holding rollers, then the other pair of pistons are moved forwardly a step and are held by their holding rollers.

The shaft 4 is extended through the hub structure 7 of pistons 5 and 6, and is provided at its opposite end with a cross-arm member 56, the outer ends of which are notched, as at 56′, and the hub portion of which is secured to the shaft 4, as at 57. Keyed to the adjacent end of the hub structure 7 is a special gear 58, Figs. 10 and 11, having circumferential slots 58ª, 58ᵇ therein. Said gear has its teeth 58ᶜ on its face, and has a flange 58ᵈ around its periphery, for a purpose hereinafter referred to. Keyed to the sleeve 12 which carries pistons 10 and 11, is a special gear 59, Figs. 12 and 13, having circumferential slots 59ª and having gear teeth 59ᶜ, and also having around its outer periphery the flange 59ᵈ. Also keyed on said sleeve 12, inside of said special gear 59, is a bearing ring 60, between which and the flange 61, formed on the head 2 of the casing 1, are locking rollers 62, similar to the rollers 15, for locking the pistons 10 and 11 against backward movement, as pistons 5 and 6 are locked against backward movement by rollers 15. This action will be understood from Fig. 9. Pins 63 extend through the notches 56′ in the member 56, through the slots 58ª in the gear 58, and are connected with gear 59, as will be clear from Fig. 1. Thus when pistons 10 and 11 are moved and turn their sleeve 12, they turn said gear 59, and through said pins 63 turn the arm member 56, and the shaft 4; said pins moving in the circumferential slots 58ª in gear 58. Referring to Figs. 1, 14 and 15, 64 designates a shaft head comprising a stub shaft 64ª, a flange 64ᵇ and a drum or band 64ᶜ secured to the flange 64ᵇ by means of ears and screws, as at 64ᵉ. Said band 64ᶜ is provided with slots 64ᵈ and notches 64ᵉ. When said shaft head and its drum or band are in place, as shown in Fig. 1, the short arms between the ends of the slots 58ᵇ of the special gear 58, move in the slots 64ᵈ in said band. Therefore when pistons 5 and 6 and their hub structure 7 turn, they turn gear 58 and its short arms move in the slots 64ᵈ in said shaft head 64 for the length of the slots. Then the shaft head 64 and its slots are moved forwardly a partial turn, moving their slots over the short arms for the length of the slots. Thus step by step said parts are advanced. Said band 64 carries four inwardly projecting pins 65 which carry pinions 66, which mesh with the gear teeth on the adjacent faces of the special gears 58 and 59. This arrangement forms a differential between the hub structure 7 and the sleeve 12. This differential increases the power or leverage of the pistons.

Referring now to Figs. 1, 16, 17 and 18, I will describe a starting mechanism for my engine, made as a part thereof. Mounted on the side of the casing head 2 is a drum like member 67 having the inner annular flange 68. Yieldingly supported in said drum are a plurality of brake shoes 69, shown in side elevation in Fig. 16, and bearing on the flanges of gears 58 and 59, said brake shoes at the outer and inner sides of said drum being arranged in staggered relationship, as will be understood from the full and dotted line showing of Fig. 16.

Said shoes are supported by pins 70, having springs 71 which bear on the outside of said drum 67, as clearly indicated. Mounted around band 64° is an annular two-part ring 71, divided circumferentially as at 72. Said ring is cut out in places whereby to provide a U-shaped pocket, as indicated in Fig. 17, to receive a short shaft 73, extended through the opposite sides of said ring 71, and provided with eccentrically positioned reduced portions 72ª which carry rollers 74, 74, of soft material, on the outside of said ring 71, said rollers operating in the brake shoes 69. Said short shaft 73 is also provided with a gear 75, and with a coiled spring 76, around said shaft 73, said spring being connected at one end to the half gear 75 and at its other end with the side of the ring 71, as clearly indicated in Fig. 17, showing this detail of construction in enlarged sectional view. This spring keeps the half gear normally turned so as to hold the eccentric shaft ends and the brake rollers raised, or in positions so they will not operate on the brake shoes until turned. Said ring 71 is also cut away in places in its inner face, as at 71ª, to receive holding rollers 77, for locking said ring 71 to the outside of the band 64° of the shaft head 64, in a manner similar to the rollers in Fig. 9. Surrounding the ring 71 is a gear ring 78, having on its inner face, at different places, groups of gear teeth 79 to mesh with the half gear 75 on the eccentric shaft ends 73ª. The gear ring 78 has an interfitting engagement with the ring 71 and can move slightly relative thereto, as permitted by the half gears 75. The ring 71 and the gear 78, carrying the rollers 74, 74, therewith, are rotatable so that the rollers 74 move through the brake shoes 69 to depress said brake shoes if the rollers are moved down by the turning of their shaft 73. The teeth on said gear ring 78 operate to turn the eccentric shaft to move said brake shoe rollers 74 down into position to depress the brake shoes 69 when they pass through them. The brake shoes are operated to hold first one of the gears 58 and 59 and then the other, by pressure upon their flanges, as indicated in Fig. 1. Thus in starting the engine, one side of the differential is permitted to turn while the other side is held for compression, and then the other side is held, until the engine starts. As a means for turning said gear ring 78, I have provided a gear 79, Fig. 1, having a shaft 80, which can be connected to any suitable motor for starting the engine.

I claim:

1. In a rotary gas engine, a piston casing, two pairs of pistons rotatably mounted therein in crossed relationship with each other, means for intermittently locking said pistons against backward movement, means providing inlet and exhaust ways around the axis of said pistons, longitudinally thereof, control valves for gas supply movable longitudinally around the axis of said pistons, and control valves for exhaust movable transversely of said axis, whereby the inlet and exhaust is controlled, substantially as described.

2. In a rotary gas engine, a piston casing, two pairs of pistons rotatably mounted therein in crossed relationship with each other, means for automatically locking said pistons against backward movement, inlet and exhaust means provided through the hub portions of said pistons and opening therebetween, controlling valves movable longitudinally of the axis of said pistons for controlling the gas inlet, a main shaft, and means on said shaft for intermittently and alternately operating said valves, substantially as described.

3. In a rotary engine, a piston casing, a shaft therethrough, a pair of pistons mounted on said shaft and having a hub portion provided with combination inlet and exhaust passageways, a second pair of pistons mounted on the hub portion of said first pistons, in crossed relationship therewith, valves for controlling the inlet of gas to said casing through said passageways, means turning with said shaft for operating said valves intermittently, said valves being held closed by explosion or compression in said casing between said pistons, exhaust valves controlling the exhaust through said passageways, said valves being successively operated by explosions in adjacent chambers, a plurality of spark plugs around the axis of said pistons, revolving contact members adapted to turn, respectively with said pairs of pistons and to successively contact with said spark plugs, a source of electric energy and connections for energizing said spark plugs intermittently, substantially as shown and described.

4. In a rotary gas engine, a piston casing, a shaft therethrough, two pairs of pistons mounted in crossed relationship in said casing and adapted to have an intermittent, alternate forward movement, one after the other, means for automatically locking said pistons against backward movement, inlet and exhaust controlling mechanism, including inlet valves yieldingly mounted and connected in pairs, means on said shaft for operating said valves intermittently and successively, one only of each connected pair of valves being opened and the other being held closed by pressure in the piston casing, said inlet and exhaust controlling mechanism also including exhaust valves adapted to be successively operated by explosions in said piston casing, substantially as described.

5. In a rotary engine of the character referred to, a piston casing, pistons rotatably mounted therein, means on the outside of said casing, at opposite sides thereof, for intermittently holding said pistons against backward movement, means for controlling inlet and exhaust to and from said casing, including inlet valves connected together for movement singly or in pairs, and means turning with said pistons for intermittently operating said inlet valves, substantially as described.

6. In a rotary engine, in combination with a piston casing and pistons rotating therein, a starting mechanism mounted on one side of said casing, including a differential, and connected with said pistons, respectively, means for automatically holding said pistons against backward movement, and means on the opposite side of said casing for controlling inlet and exhaust to and from said casing, including inlet and exhaust valves with means for intermittently and successively operating the same, and ignition means including spaced spark plugs and rotating contact members adapted to contact with said spark plugs, substantially as described.

7. In a rotary engine, a piston casing, a shaft therethrough, two pairs of pistons mounted therein in crossed relationship, said pistons having hub portions in interfitting relationships around said shaft, inlet and exhaust passageways in the hub portion of one of said pistons, and inlet control valves turning therewith relative to said shaft, and means on said shaft for operating said valves intermittently, substantially as described.

8. In a rotary engine, a piston casing, a shaft therethrough, two pairs of pistons mounted therein in crossed relationship, said pistons having hub portions in interfitting relationship with each other around said shaft, inlet and exhaust controlling mechanism, including two pairs of inlet valves connected for operation in pairs and turning with said pistons, means on said shaft for moving said valves to open said inlets, and means whereby only one valve of a connected pair will be opened at a time, substantially as described.

9. In a rotary engine, a piston casing, a shaft therethrough, two pairs of pistons mounted therein in crossed relationship, said pistons having hub portions in interfitting relationship with each other around said shaft, combination inlet and exhaust controlling means revolving with said pistons, and including inlet valves with means on said shaft for intermittently operating said inlet valves as they are revolved relative to said shaft, said inlet valves being connected together in pairs and being adapted to be separately operated, and ignition means, including revolving contact members, adapted to ignite the explosive mixture in said casing between said pistons, substantially as described.

10. In a rotary engine, a piston casing, a shaft therethrough, pistons revolubly mounted in said casing, said shaft having an inlet passageway therethrough, longitudinally thereof, for gas supply, valves for controlling said inlet to said casing between said pistons, said valves turning with said pistons, and means on said shaft for operating said valves as they are turned relative to said shaft.

11. In a rotary engine, a piston casing, a shaft therethrough having gas supply passageway therethrough, pistons mounted to turn with said shaft in said casing, valve mechanism for controlling the inlet of gas from said shaft to said casing between said pistons, and means on said shaft for operating said valve mechanism to open said gas inlets, substantially as described.

12. In a rotary gas engine, a piston casing, a shaft in said casing provided with a gas supply passageway therethrough, pistons rotatably mounted in said casing, said pistons having hub portions with inlet and exhaust passageways therethrough, valves for controlling said inlet and exhaust passageways, said inlet valves being operable by said shaft, and means carried by said shaft for intermittently operating said inlet valves, whereby to permit gas from said shaft to enter said casing between said pistons, substantially as described.

13. In a rotary engine, a piston casing, a shaft therein, pistons turning in said casing, means for locking said pistons against backward movement, said means being outside of said casing, means for controlling the gas supply to said casing, said means turning with said pistons and including inlet and exhaust valves, and means on said shaft for operating said inlet valves to open said inlet to said casing between said pistons, and ignition means, substantially as described.

14. In a rotary engine, a casing, a shaft therein, pistons arranged in crossed relationship in said casing to turn about said shaft, said pistons having hub portions extended out through the opposite sides of said casing, means for automatically locking said pistons against backward movement, the hub portion of one of said pistons having combination inlet and exhaust passageways therethrough longitudinally thereof, valves connected in pairs and turning with said pistons for controlling the inlet to said casing, means on said shaft for operating said valves as they are turned relative to said shaft, ignition means including fixed contact members and rotating contact members, and a source of electric energy therefor, substantially as described.

15. In a rotary gas engine, in combination with the piston casing and pistons therein, of inlet and exhaust mechanism, and ignition means including fixed and moving contact members, and a differential mechanism between said fixed and moving contact members, whereby to regulate said contacts, substantially as described.

16. In a rotary gas engine, a piston casing, pistons revolubly mounted therein, means for supplying gas mixture to said casing between said pistons, and ignition means comprising spark plugs having contact members thereon, revoluble contact members adapted to make and break circuits with said spark plugs, and a differential mechanism for controlling the movements of said revoluble contact members, whereby to properly time said contacts with said spark plugs, substantially as described.

17. In a rotary gas engine, a piston casing, a shaft therein adapted to admit gas mixture longitudinally therethrough, pistons mounted in crossed relationship in said casing, valve mechanism turning with said pistons for controlling the admission of gas to said casing, means on said shaft for operating said valve mechanism, valves turning with said pistons for controlling the exhaust from said casing, spark plugs having contact points, rotating contact members adapted to successively engage with said spark plugs for ignition purposes, and differential mechanism controlling the relative movements of said several contact members, whereby to properly time and control said contacts, substantially as described.

18. In a rotary gas engine of the character referred to, in combination with the casing and pistons therein, and the inlet and exhaust control mechanism, of ignition means comprising a plurality of rotatable contact members rotating with the pistons, a source of electric energy, and a differential mechanism for regulating said contact members in their movements relative to each other, whereby to properly time said contacts, substantially as shown and described.

Signed at Portland, Multnomah county, Oregon, this 7th day of February, 1919.

JAMES WILLIAM GREEN.

In presence of—
I. M. GRIFFIN,
W. R. LITZENBERG.